Feb. 6, 1934.  E. STARITZKY  1,946,039
PRECOATING IN FILTRATION
Filed May 21, 1931  3 Sheets-Sheet 1

Inventor
EUGENE STARITZKY,
Arthur Middleton
Attorney

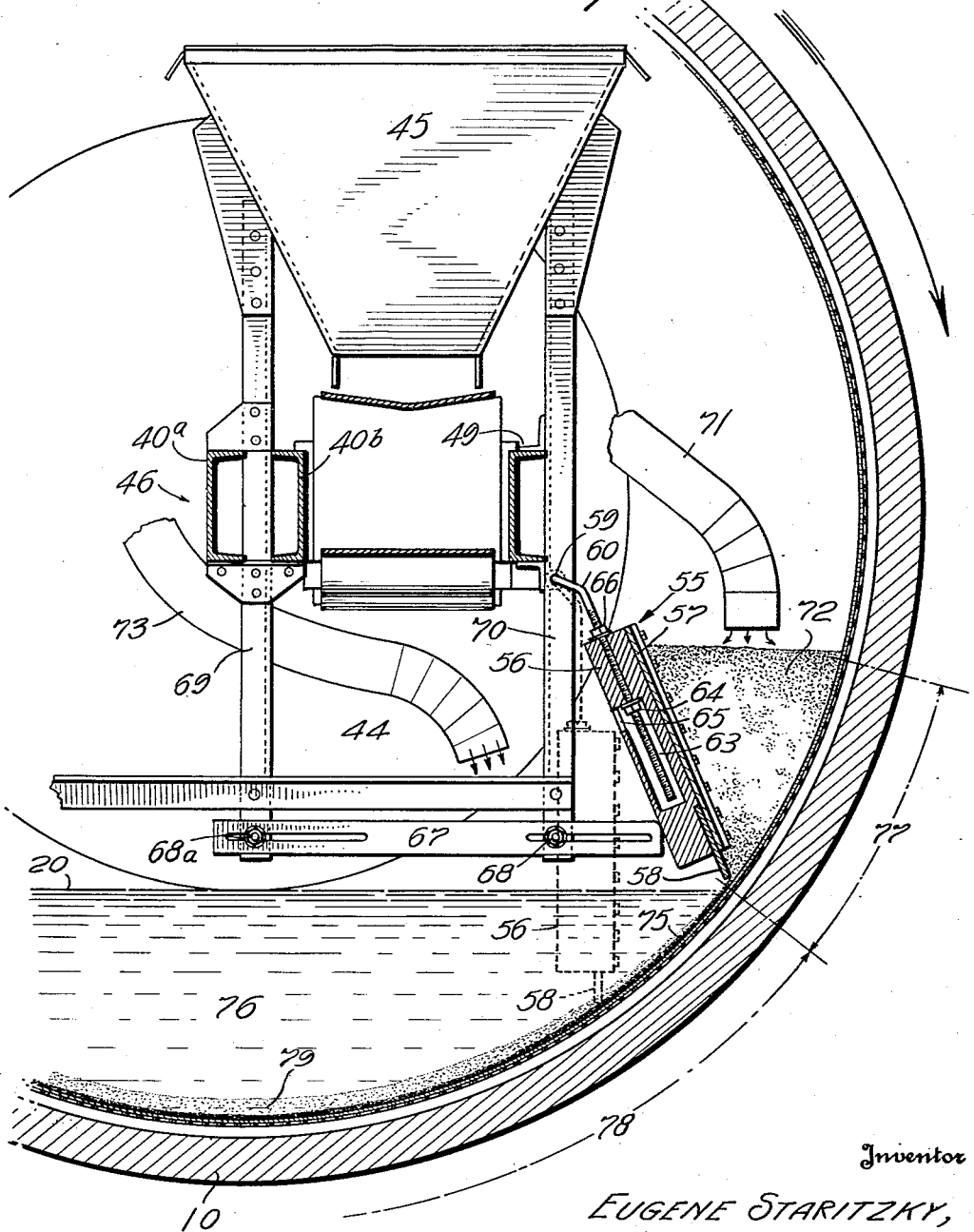

Feb. 6, 1934.  E. STARITZKY  1,946,039
PRECOATING IN FILTRATION
Filed May 21, 1931  3 Sheets-Sheet 3
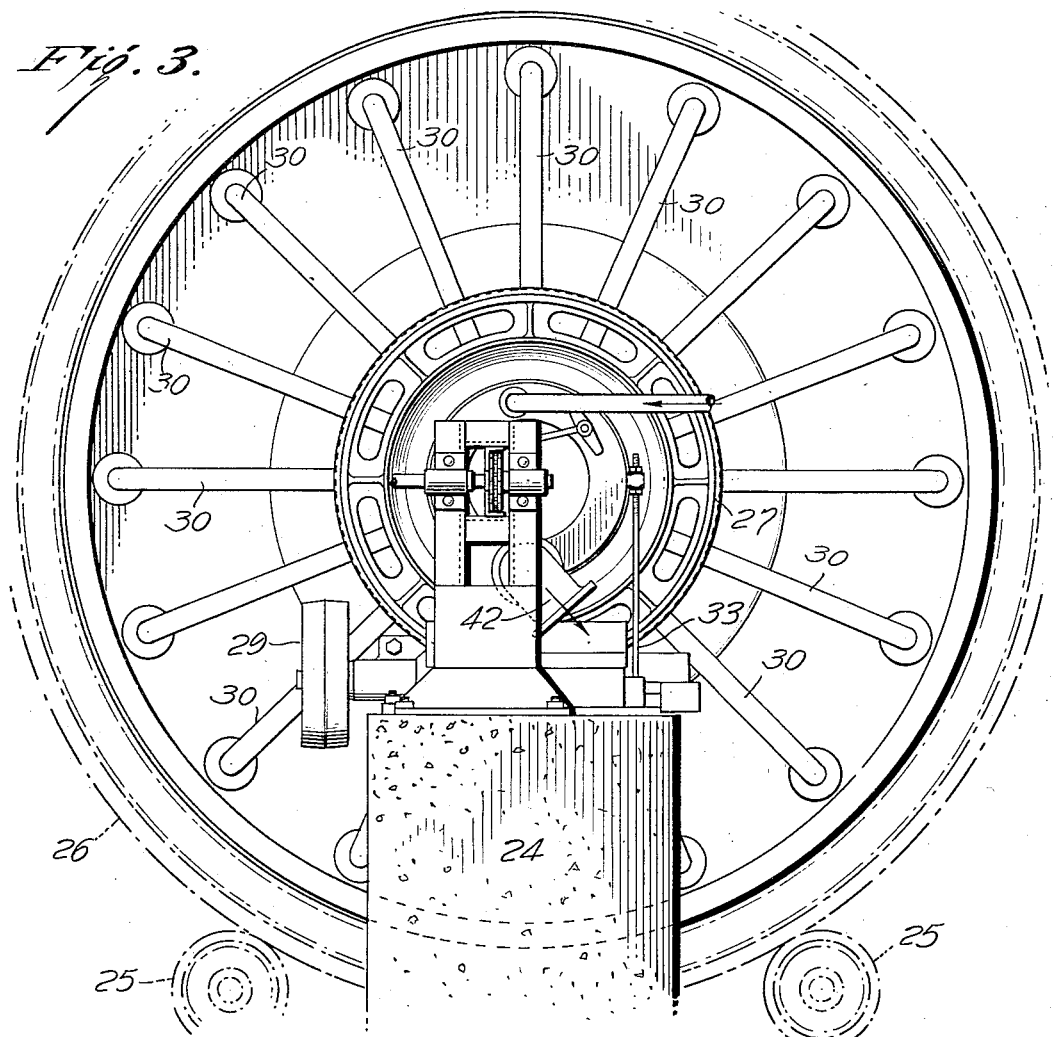
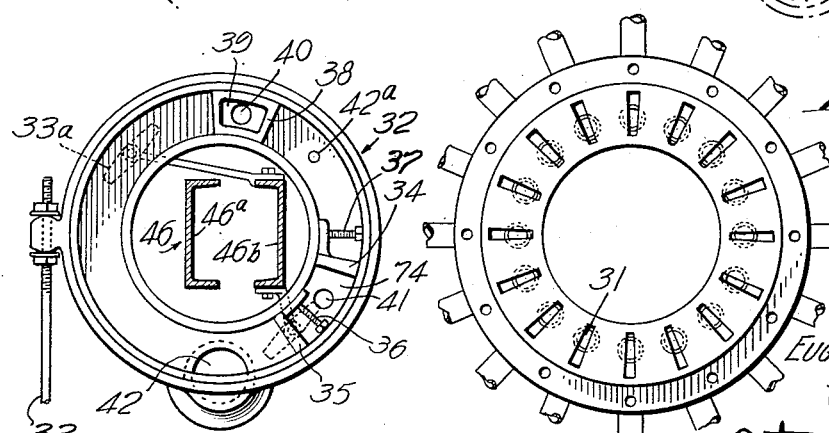
Inventor
EUGENE STARITZKY
By Arthur Middleton
Attorney Patented Feb. 6, 1934

1,946,039

UNITED STATES PATENT OFFICE 1,946,039

PRECOATING IN FILTRATION

Eugene Staritzky, New York, N. Y., assignor, by mesne assignments, to The Dorr Company, Inc., New York, N. Y., a corporation of Delaware Application May 21, 1931. Serial No. 539,117

6 Claims. (Cl. 210—202)

This invention relates to improvements in continuous filter operation. More particularly it relates to improvements in the way of filter aids. That is, to means which make possible the satisfactory filtration of difficult filtrants, such as pulps which are liable to blind the filter medium by reason of their colloidal nature, causing reduced filter capacity, sluggish cake discharge, and other troubles. The object is to make the filter capable of continuous operation with such materials.

The invention has its preferred use in those industries where the filter aid material to be employed for fine pulp filtration is available from the manufacturing process itself, and where it also forms a desirable ingredient in the final cake, as for instance in certain steps of starch manufacture. For these and other reasons the invention also relates to the adaptation of my improvements to a specific process of cornstarch manufacture described hereinafter.

Advantageously, although not exclusively, this invention is applied to the so-called internal type drum filter, that is, the type where the drum itself forms the trough for the bath of pulp from which the liquid is filtered. It is an essential characteristic of the internal type drum filter to allow the coarse particles in a fine pulp to settle out first downwardly upon the filter-medium, allowing the coarse solids to form a bed for the majority of the fines to settle upon, and preventing too intimate a constant between the fines and the filter medium. This is incidentally the feature which has favored the development of the internal type drum filter over the so-called external type where the drum operates in an exterior separate pulp trough in which undesirable settling of the coarse particles takes place.

I describe the features of my invention essentially in connection with the preferred internal drum type, which furnishes the most characteristic embodiment I am aware of at present. I wish however to include into the scope of my invention other continuous filter types as well, for instance the external drum type, the plane rotary type, or others, and I contemplate having my invention embodied therein.

The main feature relates to having the filter medium first separately coated with some substance which is more easily filterable than the material to be filtered, as I have found that by such "pre-coating" unusual, new and superior results can be obtained, especially with certain filtrants which to my knowledge have hitherto refused to submit to any known method of continuous filtration on a satisfactory commercial scale.

I am aware of the fact that the method of applying filter aids in the form of a pre-coat has been practiced in discontinuous or intermittent fashion with filter presses. The procedure in such batch operation has been, to filter coarse pulp and fine pulp successively whereby a composite cake was formed consisting of a base of coarse, and a top layer of fine material. After discharging the cake from the compartments of this stationary machine, it was ready for a new batch. My invention advances over this practice by improvements of structure and operating method in the continuous type of filter.

When handling some such materials in continuous filters the fines will blind and foul the filter medium blanketing the same in a thin impervious layer. With other materials, the filter cake will crack in the drying zone and the individual pieces or islands will cling obstinately to the filter cloth, resisting discharge, whereupon the filter blow-back discharges quite ineffectively through the cracks. In both cases the efficiency of the filter operation is seriously impaired, capacities lowered and the discharged cake is too high in moisture due to poor suction through a partly blinded or improperly cleaned filter medium. In other words the process is too inefficient to be satisfactory in continuous operation.

The present invention advances specifically over an older method of operating internal drum filters, in which a certain amount of coarse matter in a fine pulp is allowed to settle out or segregate first upon the filter medium allowing the majority of the slower settling fines to deposit thereon, the tendency being to prevent too intimate a contact of the fines with the filter cloth. Another suggestion along that line has been to admix coarse material or filter aid, if such was lacking in the pulp, in an amount which will help to sustain the above conditions. According to this invention, a pre-coat of filter aid material is continuously applied to the internal drum filter medium, allowing a type of filter aid and filtrant to be handled in the filter, which will not readily segregate when in mixture.

My method of continuous pre-coating is superior to the known expedients, in that it produces a distinct, controlled stratification of the cake, and I have found that certain materials will not filter satisfactorily in continuous filters until handled in this manner.

In the preferred internal type of drum filter, this invention lends itself to a simple and practical embodiment. A suitable baffle attachment or partition arranged within the drum may divide the lower portion thereof into two longitudinal compartments, which are to receive separately the coarse matter or filter aid, and the fine pulp respectively. Marginal flexible strips may seal the compartments against excessive leakage from one to another, the clearance between the lower edge of the baffle and the drum being adjustable and arranged to admit the desired thickness of coarse material into the fine pulp compartment. Upon the coarse solids descend the finer or colloidal size solids covering the bed, until it has reached the proper thickness, making a cake of desired properties and composition. In this way the fines are prevented from reaching the filter medium or cloth. Fine particles which tend to invade the coarse layer are arrested in the tortuous passages thereof. Thus the suction through the clean filter cloth and the coarse layer is unimpeded, offering the full benefit of the draining action of the coarse layer for the fines thereon, to the end of obtaining a cake of maximum dryness at a minimum of operating cost.

Consequently a relatively thicker layer of fines may be formed, while the suction operates to retain in an efficient manner the top layer or blanket upon the bed of coarse solids, as the composite cake emerges from the bath. When releasing suction, and applying the usual back-blow upon the filter cake in the upper zone of the drum, the cake is caused to follow gravity as it drops to discharge. With the interposed layer of coarse solids, the cake discharges readily with no trace left upon the cloth to impair or upset efficient continuous operation.

In the example of cornstarch manufacture described hereinafter, the coarse matter or filter aid is available in the form of a pulp in certain quantities incidental to the manufacturing process in which the fine pulp is to be filtered. The coarse matter in question is of the type which does not segregate readily when mixed with the fine filtrant. With the present arrangement in an internal drum filter, the two pulps can be filtered in two adjacent compartments of one and the same filter in an efficient and economical manner. As they yield simultaneously from the process, a cake results which presents a desired combination of coarse plus fines which is generally used for stock feed purposes.

A feature of refinement in the preferred internal drum filter provides additional peripheral adjustability of the baffle or partition within the drum, which is desirable for certain operating reasons.

In conjunction with such adjustability another feature provides differential suction in the two pulp compartments with regard to the different filtering characteristics of the pulps, and which may be provided for by suitable arrangement in the well known master valve of the filter.

In this way the relative effective filter areas of the compartments may be adjusted with regard to the filtering characteristics, there being also the requirements that a certain minimum of the cycle must be allotted to the pre-coating action, requiring at least one fully submerged filter panel.

It is important to note that with these refinements it is possible to maintain at all times in the pre-coating compartment an equal or higher hydrostatic level than in the fine pulp compartment. This is important lest the level in the pre-coating compartment should ever unduly drop, and induce an undesired flow from the fine pulp compartment, by which some of the fine filtrant would come in direct contact with the cloth.

Another feature of my invention is the arrangement by which the adjustable baffle is timed, and set with relation to the zones of differential suction.

My improved method and apparatus are preferably employed in the gluten filtration step in a process of cornstarch manufacture. In such a standard process the corn is mechanically comminuted in a certain manner, in order to liberate the starch, and the product is then submitted to a number of wet classification or starch washing steps, in which are usually eliminated three grades of impurities or by-products.

The commercial grade of pure starch is obtained from these elimination steps, and the by-products consist of the cellular or tissuey substance recovered chiefly as bran, and grits, and the proteins which form the essential constituent of the so-called gluten.

These products though recovered separately and by different methods, are usually combined before marketing and together form a by-product of the cornstarch manufacture, which is used as stockfeed.

According to my tests I attain the most satisfactory results in the filtration of gluten when using the fibrous by-products preferably the grits, or a mixture of grits and bran as a pre-coating material.

In the conventional process the thin gluten sludge as recovered from the starch washing tables, is dewatered by sedimentation followed by filtration usually in filter presses whereupon the moisture is further reduced to the desired degree in rotary driers. With my improvements, the economical use of continuous vacuum filters is now possible in this step with a material previously not well suited for filtration by the continuous process.

My improvements also alleviate or overcome certain irregularities of operation encountered in the general plant performance. It is common knowledge that corn which has been superheated in storage or during transportation yields gluten which is extremely difficult to filter. When handling such corn, the filtration operation presents considerable difficulties to the manufacturer and this operation usually forms the bottle neck which reduces the capacity of the plant in accordance with the variations of the nature of the corn. By applying my invention, it is possible to maintain more uniform capacities of the filter and hence, of the entire plant.

In standard practice, the gluten is recovered in the last starch washing as tailings from the starch washing tables. It is of fine or colloidal size and contains essentially proteins and residual starch. As the starch content varies with the efficiency obtained in the operation of the starch washing tables, I have discovered that with too low a starch content, the gluten will show poor filtering quality. However subsequent addition of starch appears to restore fair filterability. With my improvements, the filter is rendered insusceptible to such variations in the residual starch content, and the starch washing step may be conducted at the highest efficiency possible.

Another consideration is that difficultly filterable pulps are known to require very close control of filter speed, amount of suction etc., in order to obtain maximum efficiency. Gluten for instance, normally requires such close control and then usually forms a thin impervious layer upon the filter cloth which will discharge only incompletely unless scrapers or other forceful means of cake discharge are used, which are injurious to the cloth and otherwise impractical. Or, the cake will merely crack with the individual portions adhering to the cloth.

Such uncertainties and difficulties are eliminated by the practice of this invention for the operation is rendered less sensitive while good filter products are obtained at all times and at a more even rate.

While a particular example of the method of, and apparatus arrangement for, carrying out the invention, have been described in detail for the purpose of disclosure, it is to be understood that the invention is not limited to such particular example as to method and apparatus, but contemplates all such variations and modifications thereof as fall fairly within the scope of the appended claims, for instance whereas an internal type drum filter has been shown and described herein, the invention may be applied to an external type of drum filter.

Drawings of a preferred embodiment of my invention are attached hereto in which:

Fig. 2 is an enlarged cross-sectional view through the pre-coating filter, taken along the line 2—2 in Fig. 1.

Fig. 3 is a view upon the valve end of the filter.

Fig. 4 is a detail view upon the master valve with the valve cover removed.

Fig. 5 is a view upon the inner side of the master valve cover.

Figure 1:
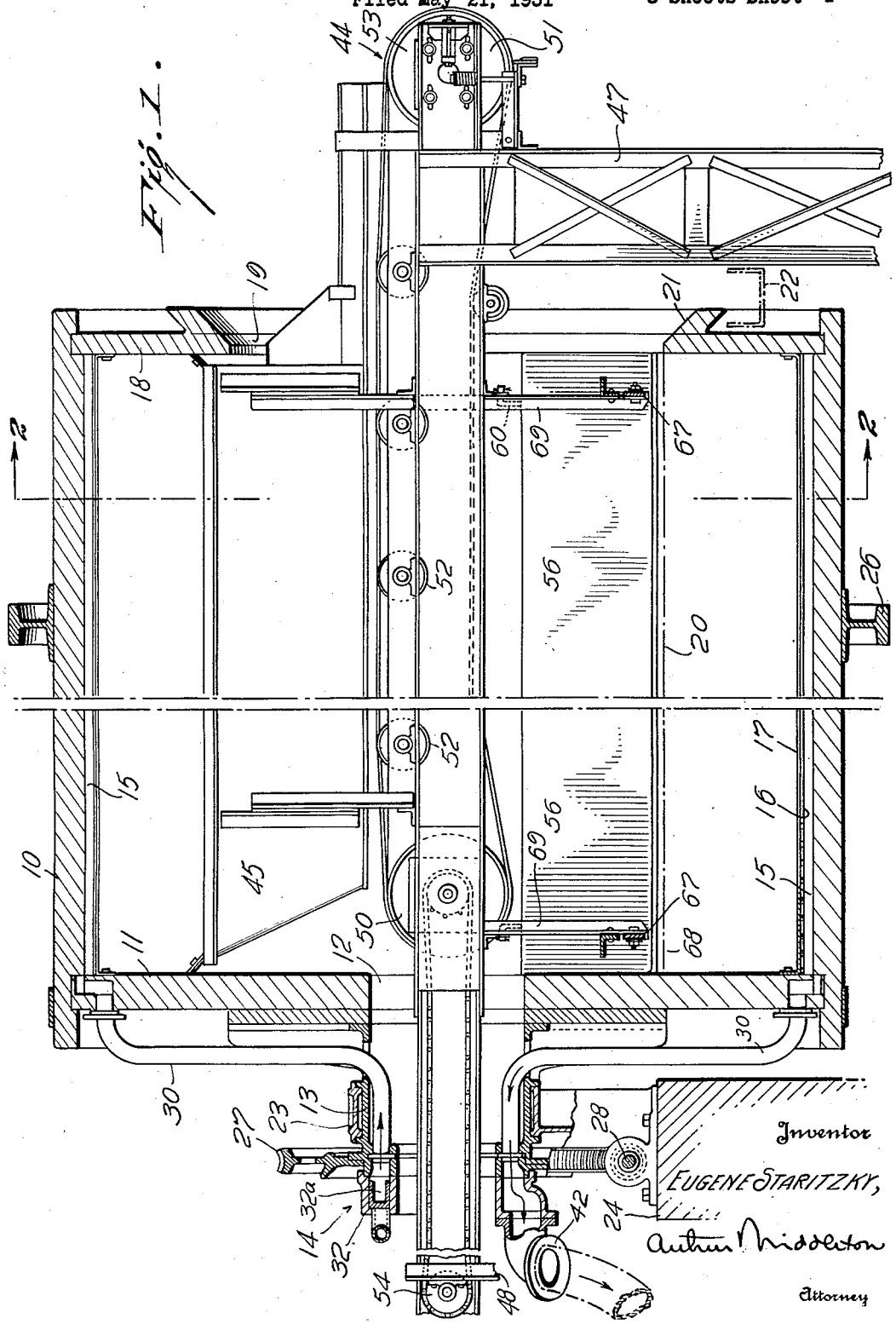
Fig. 1 shows a vertical sectional view through a pre-coating filter.

For the purpose of illustration, this invention is shown to be embodied in a rotary drum filter of the internal suction type, with an endwise cake discharge. It consists of a cylindrical shell 10, which is herein shown to be formed of wooden slats for acid resistance. The rear end of the drum is formed by a wall or end plate 11, which has an opening 12 over which is mounted a hollow trunnion member 13 which carries at its rear end the usual master valve mechanism 14 hereinafter described. The drum has provided thereon the ordinary longitudinal filter sections or panels 15, with a filter backing shown at 16 and the filter medium proper at 17. The front end of the shell is formed by an annular end plate 18 with an opening 19 through which the filter product is discharged. The opening 19 must be large enough for certain cake discharge means to pass therethrough, and it also determines the maximum pulp level within the drum, such level being indicated at 20 Fig. 2. Opening 19 in the front end plate has the usual crimped edge 21 which allows a surplus of the pulp in the bath inside the drum to overflow into the launder 22 from where it is disposed of in any suitable manner.

The drum is supported for rotary movement at the rear by a journal 23 in which it carries said trunnion member 13, said journal anchored upon a base 24. The front end of the drum operates in the usual manner upon supporting rollers 25 through a circular track rail 26 fixed upon shell 10. The drum is driven through a worm gear 27 fixed upon the trunnion 13 and meshing with a worm 28 having bearings anchored upon the base 24, the worm shaft carrying at one end the drive pulley 29.

The trunnion member 13 forms part of the usual master valve by which suction and pressure respectively are distributed to the individual filter panels of the drum. Within the trunnion are mounted the ends of pressure or suction distributing pipes 30, terminating in slot-like narrow openings 31 (see Fig. 4), and leading in an S-shaped curve each to one individual filter panel of the drum. The master valve cover 32 fits over the open end of the trunnion member to cover said distributing openings 31. The cover is held stationary in properly adjusted position by the torque rod 33 while the drum rotates, the valve cover being held upon its seat by spring members 33a and 33b mounted upon beam members hereinafter to be described. Suction and pressure are distributed to the proper zones of the filter drum. For the purpose of this invention the cover 32 is provided with means for producing differential suction zones in the filter, such as will be presently described, and it also provides for the usual cake blow-off zone.

The master valve cover 32 is in the form of a U-shaped channel forming an annular groove 32a, which covers the distributor openings 31, and in the groove are placed adjustable partitions 34 and 35, or so-called bridges which determine the various suction and pressure zones of the filter (Fig. 5). These bridges 34 and 35 are adjustable within the groove or channel of the cover, and settleable as by set screws 36 and 37. A member 38 defines by the length of its hollow 39 the range of the cake blow-off zone, and it must be adjusted to correspond to the location of the cake receiving device within the filter drum. Pressure enters through an opening or nozzle 40 in the blow portion of the master valve. A suction nozzle 41 draws from the pre-coating zone the range of which is defined by the length of space between the bridges 34 and 35. Another nozzle 42 draws from the main filtering portion of the master valve which accordingly lies past the bridge 35. The numeral 42a indicates a connection in the cover with the atmosphere for the purpose of releasing the pressure in the panels after the same have passed the blow-off zone, which connection may also be used for introducing a pressure fluid into the panels for cleaning the filter medium.

The filter drum in the present embodiment is shown to be of considerable length, and has a conveying mechanism extending within the drum for cake discharge. The filter cake is dropped from the top portion of the drum into a longitudinal hopper 45 arranged in suitable position below the top portion of the drum and it is carried out of the interior by means of an endless belt conveyor 44. The supporting structure for the cake discharge mechanism or conveyor includes a main beam 46 consisting of the companion members or channels 46a and 46b extending longitudinally through the entire drum, projecting through the front opening thereof and also through the central hollow in the trunnion member 13 and the master valve 14. The front end of the beam is supported by a rigid structure in the form of a stand 47, the rear support of the beam being merely indicated in the drawings by member 48. An auxiliary beam or channel iron 49 is braced through suitable rigid connections from the said main beam, both beams forming the mountings for the end rollers 50 and 51 of the belt conveyor, and in addition thereto for the auxiliary idlers 52 supporting the upper or active run of the conveyor belt. The conveyor mechanism of course may include suitable take-up and adjusting means 53 and 54 as shown at each end of the conveyor for adjusting the end rollers thereof.

The filter drum so far described is of substantialy standard design. An attachment or adjustable baffle wall 55, as most clearly shown in Fig. 2 constitutes the mechanical improvement in this filter according to one specific embodiment of this invention, and which makes it possible to provide two successive longitudinal pulp compartments connected with the filter drum. The one compartment filled with pre-coating material causes a filter panel passing therethrough to be covered with a preliminary coat of coarse or pre-coating material, the succeeding compartment being the main filtering compartment in which the fines of a pulp are filtered upon said preliminary layer. The baffle 55 thus may form a common dividing wall between the two pulp compartments whereby two adjacent pools of different materials are maintained in contact with the filter drum.

The novel attachment 55 consists of a baffle or partition 56 which is herein shown to be of wood, and mounted with marginal strips 57 of flexible or other suitable material for sufficient contact and proper cooperation between the baffle and the adjacent portions of the drum. A strip 58 along the lower edge provides a suitable working edge for trimming the layer of pre-coating material as it enters from the pre-coating compartment into the main filter compartment. It is noted that the baffle extends substantially parallel to the conveyor structure and that it may be conveniently hinged at points 59 to said structure by means of suspension rods 60. A structural problem is thus solved by utilizing the existing structure of the conveyor mechanism for suspension of the baffle longitudinally thereof.

It is desirable to have the baffle wall universally adjustable within certain limits, that is radially and angularly adjustable to meet various operating conditions in the filter. To this end the suspension rods 60 are shown to be threaded and extending plungerlike into the interior of the baffle wall. A hollow 63 in the baffle accommodates the lower end of the suspension rod and also a nut 64 thereon which is accessible through opening 65, a lock nut 66 being shown at the upper end of the suspension rod in order to fix the setting of the rod in the baffle.

After the radial length of the baffle is determined the baffle may be given the proper operating relationship, that is clearance with the surface of the filter medium by means of a settable member 67 against which the weight of the suspended baffle wall is allowed to rest, thus determining the angular position of the baffle. The member 67 is clearly shown in Fig. 2 as having screw and slot connections 68 and 68a by which it is fixed upon depending members 69, 70 of the conveyor structure.

Two extreme positions of baffle adjustment are shown in Fig. 2 indicating a possible range of adjustment which takes care of various operating conditions in the filter. In its elevated position the baffle makes available additional filtering area of the drum, such as would otherwise be idle. The respective filtering compartments then have staggered pulp levels, with one pulp level elevated above the other.

The numeral 71 indicates the feed inlet into the pre-coating compartment for the pre-coating material which may be in the form of a pulp 72, the inlet for the fine feed in the main filtering compartment being indicated at 73.

According to a preferred mode of filter operation of this invention, there is applied differential suction to the pre-coating zone and to the main filtering zone respectively, which means that the amount of suction in these zones can be adjusted according to the filtering characteristics of the particular material in each compartment. In the case of baffle adjustment as in the dot and dash position (see Fig. 2), this means further that the relative suction may be so adjusted as to preclude an escape of fines from the main filtering compartment back into the pre-coating compartment where the fines might reach the surface of the filtering medium proper.

This feature of differential suction is taken care of by the bridges or partitions 34 and 35 in the master valve cover, where the space 74 between the bridges defines the range of the pre-coating suction zone, and these bridges may be set in accord with the setting of the baffle member 55.

The preferred filter arrangement as shown in the drawings may be used with advantage in the step of gluten filtration in cornstarch manufacture. The operation thereof is as follows:

The most suitable setting of the baffle being determined, the coarse feed, that is a pulp of corn husks or bran or the like is fed into the pre-coating compartment. This pre-coating pulp is obtained from earlier steps of the manufacturing process and is according to the new practice suitably disposed of and filtered in the gluten filtration step. It is fed through the inlet 71 at a suitable rate, while the drum rotates in the direction of the arrow shown, and suction as induced from the nozzle 41 of the master valve causes the preliminary layer of coarse material to form upon the filter-elements which are submerged in the pre-coating zone. The layer is trimmed to a definite thickness indicated by the numeral 75, as the material passes through the clearance between the lower strip 58 of the baffle and the filter surface. As the drum rotates the preliminary layer enters the main filtering zone which is defined by the depth of the pulp bath 76 which consists of fines or gluten in suspension.

Since the coarse matter or husks are held down by suction upon the filter medium they will stay properly stratified thereon, whereas otherwise these husks being of relatively low specific gravity as compared with the fine gluten pulp, might go into suspension in that pulp, or else if mixed therewith as a filter aid would not readily settle. The method according to this invention allows proper stratification disregarding the relative specific gravity of the ingredients.

The fine or gluten pulp is shown to be fed through the inlet 73, and a steady pulp level 20 is maintained as the surplus of feed overflows into the launder 22 over the crimped edge 21 of the opening in the front end of the drum. The pre-coating and the main filtering zones are indicated upon the circumference of the drum (in Fig. 2) by numerals 77 and 78 respectively. If a different degree of suction be applied to each of these zones, it can be effected by the proper setting of the bridges 34 and 35 in the master valve, said bridges then being set in accordance with the setting of the baffle 56 in the drum.

Suction through the main suction nozzle 42 acts through the primary layer 75 causing a layer of fines 79 to deposit thereon in the main filtering zone. The fines cover the coarse layer in a blanket-like manner, and suction maintains as the composite cake emerges from the bath, and until it passes on to the cake discharge zone in the top portion of the drum. After the cake reaches the zone above the discharge hopper 45 the suction upon the filter elements is released and the usual back-blow applied in order to drop the filter cake into the hopper. The length of the back-blow zone corresponds to the length of the port 39 in the master valve cover where pressure fluid enters through the nozzle 40.

Due to the interposed layer of coarse material next to the surface of the filter medium the cake detaches readily therefrom, and without leaving traces of cake or fine particles upon the medium.

In this manner of operation not only a desirable product is obtained continuously from the filtration step, but the filter medium is also kept continuously in a clean condition.

What I claim is:

1. In a process of cornstarch manufacture, the method of filtering the various grades of by-products thereof as obtained from wet separation steps which consists in forming a primary layer of the coarser by-products upon a filter element under suction, and allowing the fine by-products to filter upon said primary layer.

2. In a process of cornstarch manufacture, the method of filtering gluten which consists in forming a primary layer of corn husks upon a traveling filter element under suction, and allowing the gluten to filter continuously upon said primary layer.

3. In a continuous rotary filter having a drum, filter elements thereon adapted to be submerged in a bath of filtrant, means for producing suction upon said filter elements whereby filter cake is formed thereon during submergence thereof, a baffle element cooperatively related with the filter elements in a manner to establish differential filtering zones upon the filter medium, a support for said baffle element, and means for adjusting said baffle element relative to said filter elements and longitudinally of said support.

4. In a continuous rotary filter, having a drum, filter elements upon the inside of said drum, adapted to be submerged in a bath of filtrant in the drum, means for producing suction upon said filter elements whereby filter cake is formed thereon during submergence thereof, a stationary longitudinal baffle element inside the drum and being cooperatively related with the filter medium in a manner to produce differential filtering zones upon the filter medium, means for supporting the baffle means within the drum, and means for radial and angular adjustment of said baffle element relative to the filter medium.

5. In a continuous rotary filter having internal filter panels, adapted to be submerged in a bath of filtrant in the drum, a master valve for controlling the suction upon said panels, whereby cake is formed thereon, means comprising a baffle element arranged to produce differential filtering zones upon the filter panels, and means embodied in the master valve for providing differential suction for each zone.

6. In a continuous rotary filter having internal filter panels adapted to be submerged in a bath of filtrant in the drum, and a master valve for controlling the suction upon said panels whereby cake is formed thereon, means comprising an adjustable baffle element arranged to produce differential filtering zones upon the filter panels, and adjustable means embodied in the master valve for providing differential suction for each filtering zone by timing said adjustable means with said adjustable baffle element.

EUGENE STARITZKY.